United States Patent
Aggarwal

(10) Patent No.: US 9,165,328 B2
(45) Date of Patent: Oct. 20, 2015

(54) SYSTEM, METHOD AND COMPUTER PROGRAM PRODUCT FOR CLASSIFICATION OF SOCIAL STREAMS

(75) Inventor: Charu C. Aggarwal, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 458 days.

(21) Appl. No.: 13/588,891

(22) Filed: Aug. 17, 2012

(65) Prior Publication Data

US 2014/0052673 A1    Feb. 20, 2014

(51) Int. Cl.
| | |
|---|---|
| G06N 5/00 | (2006.01) |
| G06F 1/00 | (2006.01) |
| G06Q 50/00 | (2012.01) |
| G06N 99/00 | (2010.01) |
| G06F 17/30 | (2006.01) |

(52) U.S. Cl.
CPC .......... *G06Q 50/01* (2013.01); *G06F 17/30707* (2013.01); *G06N 99/005* (2013.01)

(58) Field of Classification Search
USPC ......................................................... 706/12
See application file for complete search history.

(56) References Cited

U.S. PATENT DOCUMENTS

| | | | |
|---|---|---|---|
| 2011/0125750 A1 | 5/2011 | Dieberger ET AL | |
| 2011/0167115 A1 | 7/2011 | Gilbert et al. | |
| 2011/0196870 A1* | 8/2011 | Schmidtler et al. | 707/737 |
| 2011/0276396 A1 | 11/2011 | Rathod | |
| 2013/0097103 A1* | 4/2013 | Chari et al. | 706/12 |
| 2013/0151522 A1* | 6/2013 | Aggarwal et al. | 707/737 |

FOREIGN PATENT DOCUMENTS

WO    WO 2012031262    9/2011

OTHER PUBLICATIONS

Cano et al., "Volatile Classification of Point of Interests based on Social Activity Streams" Oak Group, Dept. of Computer Science, The University of Sheffield, Uk 2011.
Cano et al., "Capturing Entity-Based Semantics Emerging from Personal Awaren4SAtreams,"in MSM2011—1st Workshop on Making Sense of Microposts.
Malcher et al., "An Analytical Approach to Detect Real-World Collective Situations," in Proceedings of 1st Workshop on Social Interation in Spatially Seperate Enviroments, pp. 41-52, 2010.
Karweg et al., "Evolving Social Search Based on Bookmarks and Status Messages from Social Networks," CIKM 11, Oct. 24-28, 2011, Glasgow, Scotland, UK.

(Continued)

*Primary Examiner* — Jeffrey A Gaffin
*Assistant Examiner* — Kalpana Bharadwaj
(74) *Attorney, Agent, or Firm* — Janice Kwon, Esq.; McGinn IP Law Group, PLLC

(57) ABSTRACT

A method of labeling an unlabeled message of a social stream. The method including training a training model based on labeled messages, partitioning the training model into a plurality of class partitions, each comprising statistical information and a class label, computing a confidence for each of the class partitions based on information of an unlabeled message and the statistical information of a respective class partition, as executed by a processor in a computer system, and labeling the unlabeled message of the social stream according to respective confidences of the class partitions.

25 Claims, 9 Drawing Sheets

(56) References Cited

OTHER PUBLICATIONS

Chen, "Personalized Recommendation in Social Network Sites," A Dissertation Submitted to the Faculty of the Graduate School of the University of Minnesota in Partial Fulfillment of the Requirements for the Degree of Doctor of Philosophy, Sep. 2011.

Sarwar et al., "Recommender Systems for Large-scale E-Commerce, Scalable Neighborhood Formation Using Clustering" In Proceedings of the Fifth International Conference on Computer and Information Technology (2002) Key: citeulike:1091676.

\* cited by examiner

SYSTEM, METHOD AND COMPUTER PROGRAM PRODUCT FOR CLASSIFICATION OF SOCIAL STREAMS

FIELD OF THE INVENTION

The present invention generally relates to a method and apparatus for the classification of data, and more particularly to a method and apparatus for the classification of social streams.

BACKGROUND OF THE INVENTION

Social streams have become ubiquitous in recent years because of a wide variety of applications in social networks. This has resulted in an almost continuous creation of massive streams of data. For example, in some social networks, users communicate with one another with the use of text messages. This results in massive volumes of text streams. The text messages may be reflective of user interests. Thus, the particular social network may be able to leverage these text streams for a variety of mining and search purposes.

In chat and email networks, users send messages to one another. This too creates large streams of data. Some social networks have a very large number of users who may communicate with one another. As a result, the volume of text streams across a social network can be extremely large.

Many media-sharing sites contain the ability for users to make comments about the media content. Such data can also be considered social streams.

There are well known ways to collect the entire social stream (or a sample thereof) traveling across a given social network.

Typically, the social stream may experience concept drift, in which the key patterns in the underlying stream may change over time. This means that the training models may become outdated over time.

Since training models may become outdated over time, they may need to be constantly updated (or updated at a relatively high frequency) in order to ensure accurate results for classification.

In some instances, additional information about the social context of the underlying social stream is available. Social information, also known as linkage information, may provide an understanding of how different social actors in a social network are related to one another. Thus, the presence of linkage information may provide a considerable amount of feedback to the classifier based on an understanding of how the different social actors are related to different classes within the classifier.

Since the nature of the social actors may be closely related to a label used for classification, this information may help in the classification process. At the same time, it also creates an additional challenge for the classification process, because the linkage information needs to be used effectively for classification.

Another additional challenge with social streams is that they are typically very noisy, and often contain many incorrectly labeled instances, thereby making a classification based on that label inaccurate. Hash tags, for example, are generally used to label groups and topics in a social network. For instance, hash tags may be used to mark individual messages as relevant to a particular user or group of users, and to mark individual messages/documents as belonging to a particular topic. However, as is well known, hash tags can contain many incorrectly labeled instances.

For example, in Twitter™, hash tags may be used to label some of the documents for a particular topic, but this information is often quite noisy. A user may incorporate a hash tag for a message (e.g., a tweet in Twitter™), for which the content may not necessarily belong to the particular topic. At the same time, a tweet which does not contain a specific hash tag may also belong to a relevant topic.

As a result of the aforementioned noisy classification problems, it is typically very challenging to relate a class behavior of a test instance (e.g., an unlabeled or unclassified instance) of a social stream to the content of the social stream. When combined with the fact that social streams need to be classified very fast with incremental and online methods, this creates a very challenging scenario for the classification process.

The problem of text stream classification arises in the context of a number of different information retrieval (IR) tasks, such as, for example, news filtering and email spam filtering. Text streams have been widely studied, both in the context of the problems of clustering and classification. The problem of classification of data streams has been widely studied by the data mining community in the context of different kinds of data.

One conventional method for classifying text streams in which the classification model may evolve over time is a temporal weighting factor. For example, a temporal weighting factor may be introduced in order to modify the classification algorithms.

Specifically, this approach has been applied to the Naive Bayes, Rocchio, and K-nearest neighbor classification algorithms. It has been shown that, if the underlying data is evolving over time, then the incorporation of temporal weighting factors is useful in improving the classification accuracy. However, these classification algorithms are ineffective for the classification of social streams, because they are not designed for social stream classification with the use of contextual information.

Another conventional method includes one-class classification of text streams, in which only training data for the positive class is available, but there is no training data available for the negative class. This is quite common in many real applications in which it easy to find representative documents for a particular topic, but it is hard to find the representative documents in order to model the background collection. This conventional method works by designing an ensemble of classifiers in which some of the classifiers corresponds to a recent model, whereas others correspond to a long-term model.

A number of neural network methods have also been adapted to the stream scenario. In these methods, the classifier starts off by setting all the weights in the neural network to a same value. The incoming training example is classified with the neural network. In the event that the result of the classification process is correct, then the weights are not modified. On the other hand, if the classification is incorrect, then the weights for the terms are either increased or decreased depending upon which class the training example belongs to.

A Bayesian method for classification of text streams constructs a Bayesian model of the text which can be used for online classification. The key components of this approach are the design of a Bayesian online perceptron and a Bayesian online Gaussian process, which can be used effectively for online learning. However, none of these methods are designed for social stream classification with the use of contextual information.

Accordingly, the present inventor has recognized that there is a need for a system, method and computer program product for the classification of social streams with the use of contextual information.

SUMMARY OF THE INVENTION

In view of the foregoing and other exemplary problems, drawbacks, and disadvantages of the conventional methods and structures, an exemplary feature of the present invention is to provide a method and structure in which a locality sensitive hashing approach is used in order to partition the data space into a set of social contexts, so that a more effective classifier can be constructed.

A first exemplary aspect of the present disclosure includes a method of labeling an unlabeled message of a social stream. The method including training a training model based on labeled messages from the social stream; partitioning the training model into a plurality of class partitions, each comprising statistical information and a class label; computing a confidence for each of the class partitions based on information of an unlabeled message and the statistical information of a respective class partition, as executed by a processor in a computer system; and labeling the unlabeled message of the social stream according to respective confidences of the class partitions.

A second exemplary aspect of the present disclosure includes a method of social stream classification. The method includes receiving a social stream including a plurality of message instances, the plurality of message instances including at least one of: a test instance that is not classified; and a training instance that is classified; determining, for each message instance, linkage information of a sending node and a receiving node; training a training model based on each training instance; storing a plurality of statistical information including: statistical information of words in the plurality of messages; statistical information of the linkage information; and statistical information of class partitions of the training model; updating the plurality of statistical information over a period of time; and classifying, as executed by a processor on a computer, each test instance based on the plurality of statistical information.

Another exemplary aspect of the present disclosure includes a method of social stream classification using a training model including plurality of class partitions. The method including receiving a social stream including a plurality of instances, the plurality of instances including at least one of: a training instance that is classified; and a test instance that is not classified; determining, for each instance, linkage information and content information; tracking relevance information, the relevance information including: a number of times that words of the content information are relevant to one or more class partitions of the training model; and a number of times that nodes, which are determined from the linkage information, belong to the relevant one or more class partitions of the training model; updating statistical information of the training model based on the tracking; and classifying, as executed by a processor in a computer system, each test instances based on the statistical information of the training model.

Another exemplary aspect of the present disclosure includes a computer program product for social stream classification. The computer program product including a computer readable storage medium having computer readable program code embodied therewith, the computer readable program code including computer readable program code configured to receive a social stream including a plurality of message instances, the plurality of message instances including one or more of: a test instance that is not classified; and a training instance that is classified; computer readable program code configured to determine, for each message of the plurality of messages instances, linkage information of a sending node and a receiving node based on a respective message; computer readable program code configured to train a training model based on the training instance; computer readable program code configured to store a plurality of statistical information including: statistical information of words in the plurality of messages; statistical information of the linkage information; and statistical information of a plurality of class labels of the training model; computer readable program code configured to update the plurality of statistical information over a period of time; and computer readable program code configured to classify the test instance based on the plurality of statistics.

Still another exemplary aspect of the present disclosure includes a system that labels an unlabeled message of a social stream. The system including a memory device storing instructions to execute a training model, the training model being trained based on labeled messages, and partitioned into a plurality of class partitions, each of which comprise statistical information and a class label; and a Central Processing Unit (CPU) that computes a confidence for each of the class partitions based on information of an unlabeled message and the statistical information of a respective class partition, and that labels the unlabeled message according to respective confidences of the class partitions.

Still another exemplary aspect of the present disclosure includes a system for social stream classification. The system including a terminal that receives a social stream including a plurality of message instances, the plurality of message instances including one or more of: a test instance that is not classified; and a training instance that is classified; a memory device storing instructions to execute a training model, the training model being trained based on the training instance, and storing a plurality of statistical information, which is updated over a period of time, the plurality of statistical information including: statistical information of words in the plurality of message instances; statistical information of linkage information of a sending node and a receiving node; and statistical information of class partitions of the training model; and a Central Processing Unit (CPU) that determines, for each message, linkage information of the sending node and the receiving node, and classifies each test instance based on the training model.

Yet another exemplary aspect of the present disclosure includes a system for social stream classification, which uses a training model including plurality of class partitions. The system including a terminal that receives a social stream including a plurality of instances, the plurality of instances including one or more of: a training instance that is classified; and a test instance that is not classified; and a Central Processing Unit (CPU) that determines, for each instance, linkage information and content information, updates statistical information of the training model based on information that the CPU tracks, and classifies each test instances based on the statistical information of the training model.

Yet another exemplary aspect of the present disclosure includes a computer program product that stores thereon a sequence of instructions to receive and classify a social stream that includes a plurality of message instances. The computer program product including a module that, when executed by a processor in a computer system, determines, for each message instance, a relation of a sending node and a receiving node; and a module that, when executed by a processor in a computer system, implements a model that is trained based on a message instance that is classified, stores statistical information about the plurality of message instances and the relation of the sending node and the receiving node, and classifies a message instance that is not classified.

With its unique and novel features, the exemplary aspects of the present invention may provide a system, method, and computer program product for the classification of social streams with the use of contextual information.

BRIEF DESCRIPTION OF THE DRAWINGS

The foregoing and other exemplary purposes, aspects and advantages will be better understood from the following detailed description of an exemplary embodiment of the invention with reference to the drawings, in FIG. 1A is a description of the architecture of an exemplary embodiment of the present disclosure.

DETAILED DESCRIPTION

Figure 1A:
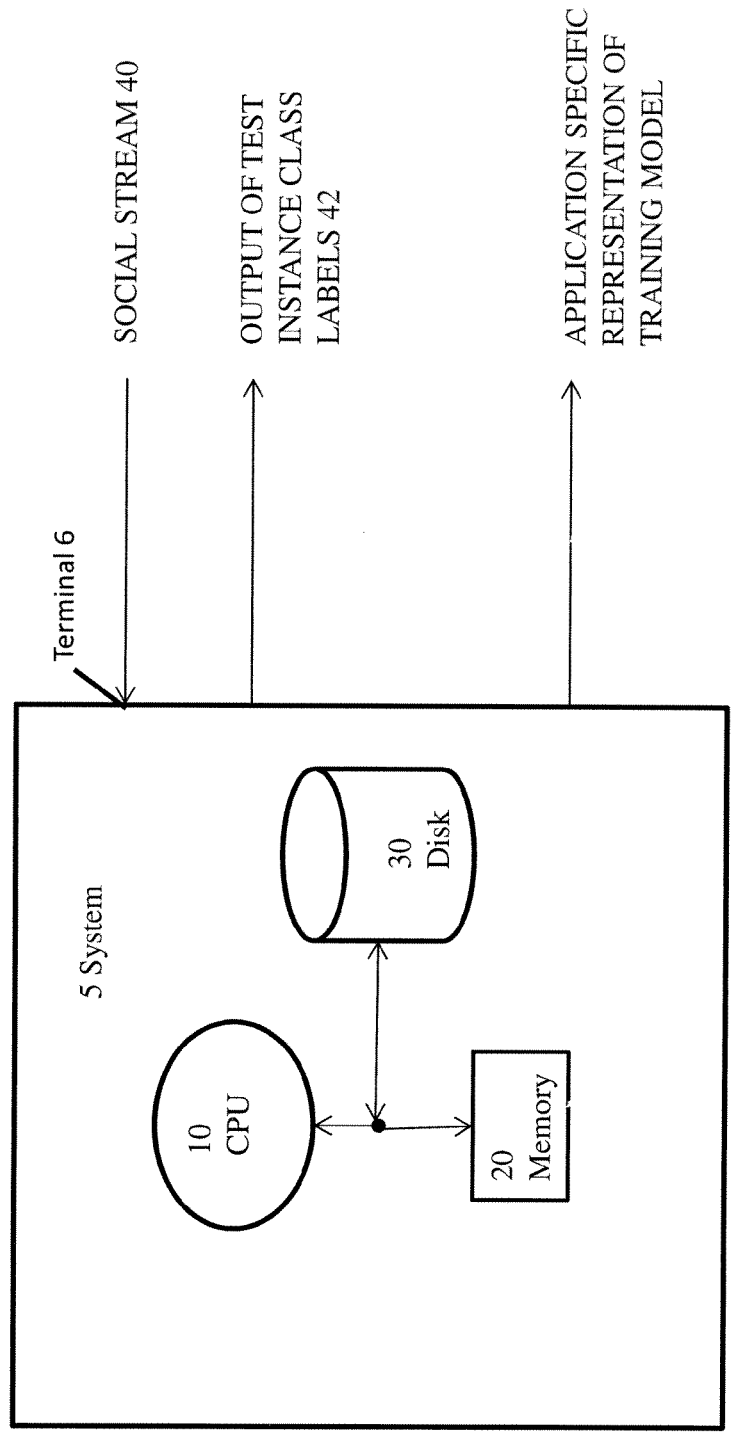
FIG. 1B is a description of a training model of an exemplary embodiment of the present disclosure.

The following detailed description describes various features and functions of the disclosed systems, methods and computer program products with reference to the accompanying figures. In the figures, similar systems typically identify similar components, unless context dictates otherwise. The illustrative system, method and computer program product are not meant to be limiting. It will be readily understood that certain aspects of the disclosed systems and methods can be arranged and combined in a wide variety of different configurations, all of which are contemplated herein.

Each message instance in a social stream (e.g., a tweet in Twitter™, an email, a message posting on a blog or social network, etc.) includes data. This data generally includes the text or content of the message and social information (also referred to herein as linkage information). Linkage information includes information about interconnectedness between different nodes (e.g., people or entities). That is, the linkage information indicates who the sender of the message instance is and who is/are the recipients of the message instance. Furthermore, the linkage information may indicate how the various nodes are connected or linked to one another.

The social stream may include a plurality of message instances, the content of each of the message instances and the linkage information about the interconnectedness of the sending and receiving nodes.

The sender node(s) and the recipient nodes(s) of a given message instance provide an effective social context for a particular topic. However, the classification of a given message instance is likely to be somewhat different within different contexts. For example, a message which is sent from a user who has frequently changed messages related to sports with a group of other similar users, is more likely to be about the same topic. It should be noted, however, that it is important not to overfit a particular topic with the use of social context.

The inventor of the present invention has realized that a locality sensitive hashing (LSH) technique can efficiently partition the incoming message instances based on their social context, without overfitting the particular topic with the use of social context.

As disclosed herein, different classifiers are construed for different social contexts. As a result, the classification accuracy can be maximized. Furthermore, multiple contextual partitioning may be constructed with different hash functions in order to maximize accuracy, while also avoiding the aforementioned problem of overfitting within one or more particular social contexts.

The incoming social stream may be partitioned into a plurality of different groups based on the social context of the sending and receiving nodes. Exemplary embodiments of the present disclosure include a training model. The training model includes a plurality of class partitions. Based on the present disclosure, one having ordinary skill in the art would recognize that these class partitions are more efficient than a purely global model.

The plurality of message instances generally includes one or more training instances and one or more test instances. Training instances may be referred to as training data or ground truth data herein. Training instances may be supervised to ensure that the proper classification is provided. On the other hand, test instances are unsupervised (unlabeled/unclassified) and rely upon the systems, methods and computer program products of the present disclosure in order to be labeled or classified.

More particularly, if an incoming message instance is a training instance, then the training model is incrementally updated with the addition of the new data point(s) contained therein.

On the other hand, if an incoming message instance is a test instance, then the test instance is classified with one or more relevant class partitions and is labeled with the majority label. In some exemplary embodiments, if the incoming message instance is a test instance, then an average class label from each relevant class partition is reported.

That is, if the social stream includes a training instance, then the training model is updated. As a result, the likelihood that a test instance of the social stream will be properly classified is increased.

FIG. 1A is a detailed description of the architecture of an exemplary embodiment of the present disclosure. A system 5 receives a social stream 40 via one or more terminals 6. The social stream 40 includes one or more training instances, which are labeled, and one or more test instances, which are not labeled. The system 5 stores a plurality of statistics, which are updated over a period of time. The system 5 also classifies the one or more unlabeled instances based on the plurality of statistics.

The system 5 includes a Central Processing Unit (CPU) 10, a disk 30 and a main memory 20. The CPU 10 is operatively coupled to the memory 20 and the disk 30, and the disk 30 is operatively coupled to the memory 20. The memory 20 may represent, for example, read-only memory (ROM), random access memory (RAM), a buffer memory device, a cache, another type of electronic memory, or any of various combinations thereof. The disk 30 may represent, for example, a disk drive, a magnetic storage drive, an optical storage device, another type of storage drive, and any of various combinations thereof.

The system 5 may receive a social stream 40 from one or more sources. The social stream 40 may include a plurality of social streams. In one embodiment, the system 5 receives the social stream 40 from one or more sources. In another exemplary embodiment, the system 5 periodically receives the social stream 40 from one or more sources. In yet another exemplary embodiment, the system 5 continuously receives the social stream 40 from one source and periodically receives the social stream 40 from another source.

The system 5 generates data based on the social stream 40 and stores the generated data on at least one of the disk 30 and the main memory 20. The CPU 10 processes the social stream 40. For example, the CPU 10 may process the social stream 40 continuously, periodically, based on a schedule, based on a user input, or based on any combination thereof.

The CPU 10 may use the main memory 20 for intermediate book keeping of one or more statistics. In one embodiment, the CPU 10 transfers the one or more statistics to the disk 30 and the disk 30 stores the one or more statistics.

At least one of the disk 30 and the memory 20 stores statistics about words that may appear in the social stream 40, linkage information of respective sender nodes and receiver nodes of the message instances, and class labels for a plurality of class partitions within a training model. The training model may be stored on at least one of the disk 30 and the memory 20.

The label of the class partition 42 is reported by the system 5.

Prior to discussing the remaining figures, it may be useful to introduce some additional notations and definitions. It is assumed that the message instances which are received by the social stream 40 are denoted as:

$$T_1 \ldots T_l$$

Each message instance $T_i$ is essentially a text document, which can be used for classification purposes, and which contains words and contextual information. If, for example, a difficult case of a massively multi-label scenario is assumed, a set of m binary labels on the documents may be tracked simultaneously. These m binary labels may correspond to the in different topics in the social stream that is being tracked. For example, in a social stream the m different labels could correspond to sports, current events, politics etc.

These m different labels are not necessarily mutually exclusive, and a subset of them may be simultaneously present in the data. For example, a post which belongs to the category of "politics" could also belong to the category of "current events". The value of the m different binary labels associated with the i-th document are denoted as:

$$l_i^1 \ldots l_i^m$$

In one exemplary embodiment, each of these labels is drawn from $\{0, 1\}$ depending upon whether or not the content belongs to that category. However, the present disclosure is not limited to a binary classification. Further, it is assumed that the multi-label vector for a given training data point is denoted as:

$$l_i^1 \ldots l_i^m)$$

Further, the sender (e.g., the sender node) of the content is drawn from a set of N social participants which are indexed as:

$$\{1 \ldots N\}$$

The sender node $q_i \in \{1 \ldots N\}$ is the sender of the message instance $T_i$ to a set of one or more receiver nodes. The object $S_i$ includes a set of one or more receiver node(s) $R_i$, which correspond to all recipients of the message instance from the sender node $q_i$. Thus, the message instance $T_i$ is sent from the sender node $q_i$ to each receiver node r∈ $R_i$. The sender node and the object may be known for each message instance $T_i$.

Figure 1B:
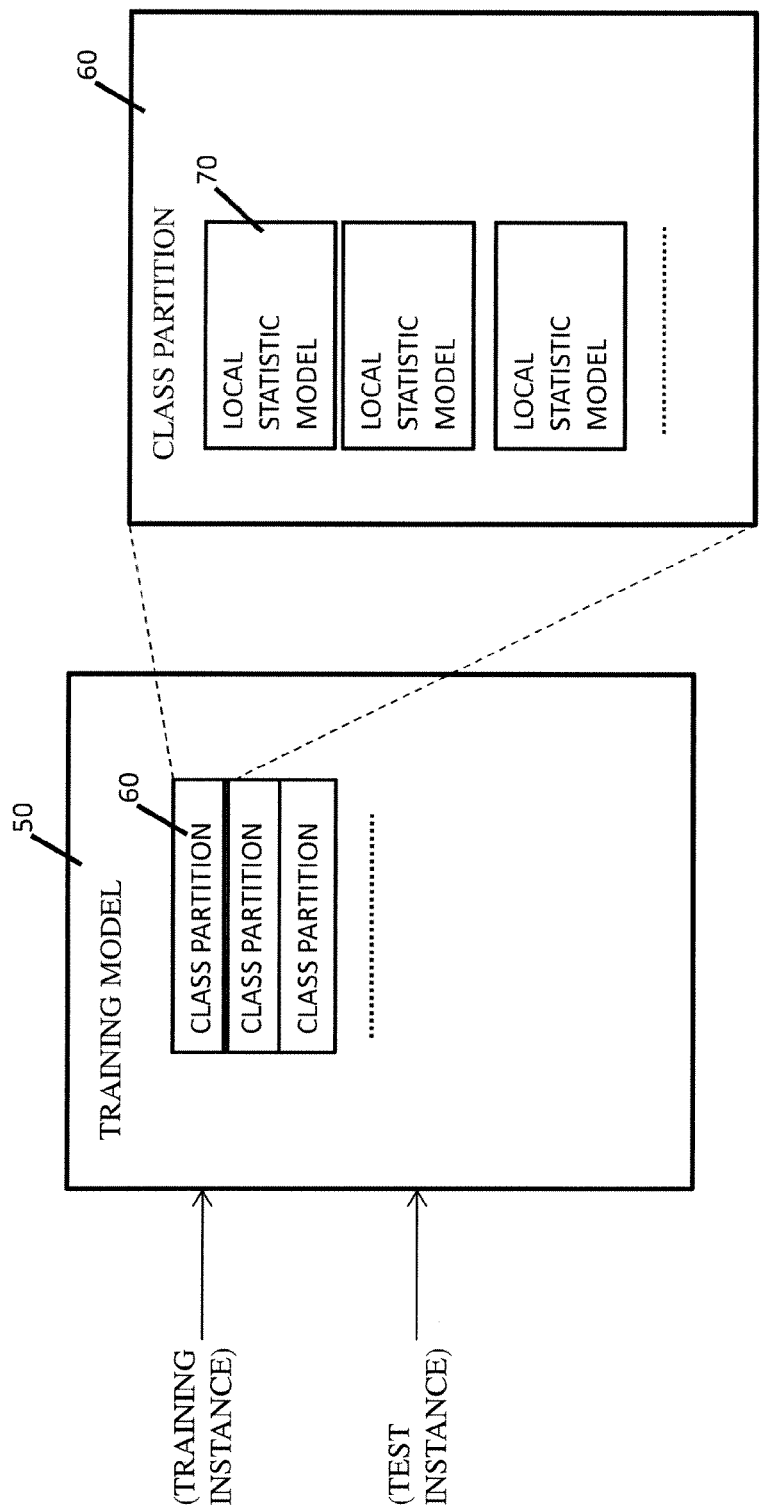

FIG. 1B, is an exemplary embodiment of the training model 50. The training model 50 receives the training instance(s) and the test instance(s). The training model includes a plurality of class partitions 60. Each class partition 60 can store a plurality of statics in local statistical models 70, which are relevant to that class partition. Each of the class partitions may include one or more class labels which are used label a test instance as having been classified according to that class partition. As is explained below, more than one class partition 60 may be used to classify a test instance, in which case the test instance will be labeled in accordance with the one or more labels of each relevant class partition.

The training model 50 may receive the instances one at a time, all at once, or in some piecemeal fashion. If a message instance is a training instance, then the training model is updated. If the message instance is a test instance, then the test instance is classified based on the class partitions 60 and the local statistics 70 included therein. For each incoming test instance, a locality sensitive hashing (LSH) procedure may be applied in order to map the test instance to the most relevant class partition 60. The LSH procedure is described in detail below.

Figure 2:
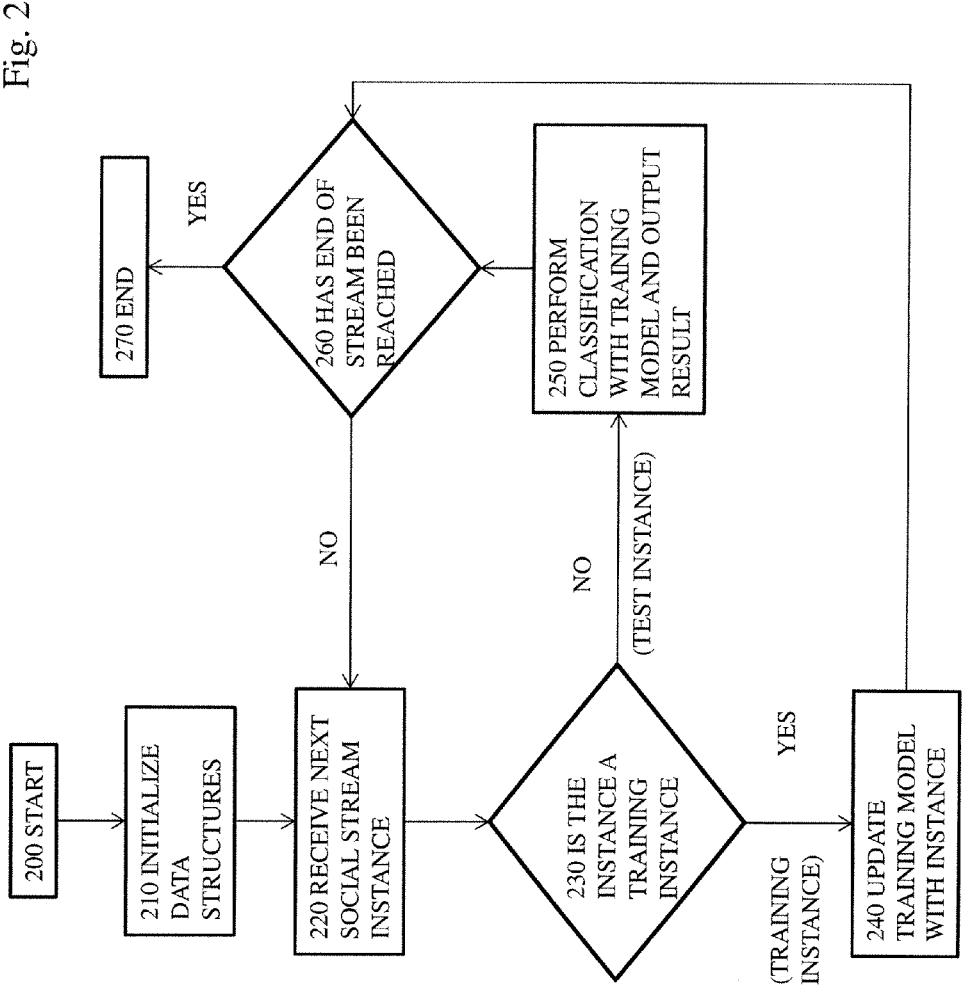
FIG. 2 is a description of an approach of training and testing according to an exemplary embodiment of the present disclosure.

FIG. 2 is a detailed description of an approach of an exemplary embodiment of the present disclosure. At block 210, the data structures are initialized. This includes the generation of random vectors $\eta_1 \ldots \eta_r$. The random vectors $\eta_1 \ldots \eta_r$ may be used for the projection process of deteimining the proper classification of one or more test instances in the social stream 40. As will be appreciated by one having ordinary skill in the art, the random vectors may be generated according to any known method.

At block 220, a next message instance of the social stream 40 is received. This instance may be one of a training instance and a test instance. At block 230, it is determined whether this instance is a training instance.

If it is a training instance, then the training model is updated. In this case, at block 240, the training model is updated with the training instance received at block 220.

On the other hand, if the instance is a test instance, then the test instance is classified with the training model at block 250. The procedure of classifying the test instance is described in further detail below.

At block 260, it is determined whether the end of the social stream has been reached. If it has been reached, then the procedure may end. If, on the other hand, the end of the social stream has not been reached, then the procedure the next message instance $T_i$ of the social stream is received at block 220. This procedure is repeated until the end of the social stream is reached.

Figure 3:
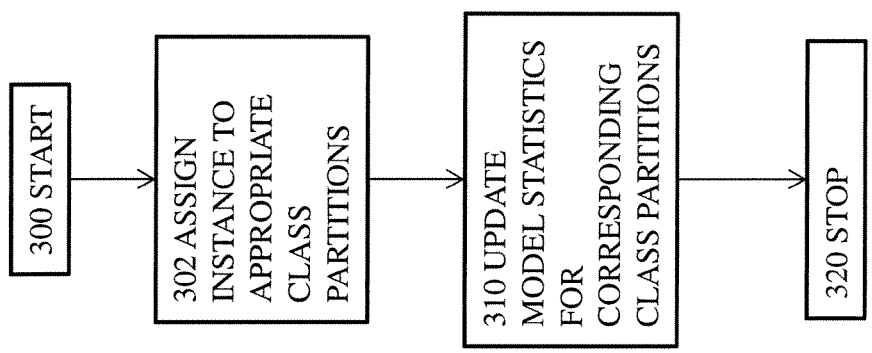
FIG. 3 is a description of a training process according to an exemplary embodiment of the present disclosure.

FIG. 3, is a detailed description of the training model update process of an exemplary embodiment of the present disclosure. In some exemplary embodiments of the present disclosure, FIG. 3 can be considered a detailed description of block 240 of FIG. 2. In general, the features disclosed herein improve the training model by updating it with the latest training instance having been received.

Specifically, at block 302, the training instance is assigned to the appropriate class partition. The linkage information of the training instance can be used in order to construct a class characteristic vector and to assign it to an appropriate class partition. At block 310, the statistics of the training model for different class partitions 60 are updated.

That is, for each incoming training instance, the relevant class partitions 60 are determined and the relevant local statistics 70 for the corresponding class partitions 60 are updated.

These local statistics 70 are updated over a period of time. In this embodiment, the local statistics 70 are updated as the system 5 receives the training instance of social stream 40. This allows a Support Vector Machine (SVM) classifier to be incrementally updated with the use of a least-squares regression for relevant class partitions 60. In another exemplary embodiment, however, the statistics may also be updated after the system 5 receives all of the messages in a particular social stream 40.

Furthermore, the online algorithm of the exemplary embodiments of the present invention may dynamically partition the solution space on the basis of the class behavior of the social patterns in the underlying data (e.g., in the social stream). In order to examine the relative behavior of the classification patterns, the online algorithm may dynamically maintain the mean statistics of the number of arrivals of each class type (e.g., training instance or test instance). Specifically, the arrival of the n-th (training) instance can cause the online algorithm to dynamically maintain the sum of the number of arrivals of each class. This value can be normalized with the total number of arrivals in order to determine the mean number of arrivals of each class type. The global average of each class (i) is denoted as $\mu(i)$ herein.

At the same time (or substantially the same time), these statistics are maintained for each actor (e.g., the sending and receiving nodes) in the underlying data. Thus, for the i-th actor in $\{1 \ldots m\}$, and the j-th class, the mean value is denoted as: $\mu^{j(i)}$. These statistics may be maintained in the same way as the global statistics.

The value of $\gamma^{j(i)} = \overline{\mu^{j(i)}} - \overline{\mu^j}$ may be either positive or negative, depending upon whether the i-th actor has an above-average or a below-average involvement with class j, and its weighted mean value over all actors is equal to zero (0). The class characteristic vector for any particular actor i is denoted as:

$$\gamma(i) = \gamma^{1(i)} - \gamma^{m(i)}$$

This vector may provides an approximate profile of the actor, as the actor relates to the different classes. The class characteristic vector may be generalized to that of a message instance $T_i$ with the sender node $q_j$ and the receiver nodes r∈$R_j$.

The class characteristic $\overline{\gamma(q_j, R_j)}$ vector of a message instanced $T_j$ with sender $q_j$ and recipient set $R_j$, is the average of the sender characteristic vector and the recipient characteristic vector. That is:

$$\overline{\gamma(q_j, R_j)} = \frac{1}{2}\left(\overline{v(q_j)} + \frac{1}{|R_j|} \cdot \sum_{i \in R_j} \overline{v(i)}\right)$$

In some exemplary embodiments, the sender and recipient characteristic vectors can be weighted differently in order to ensure an effective classification process.

Figure 4:
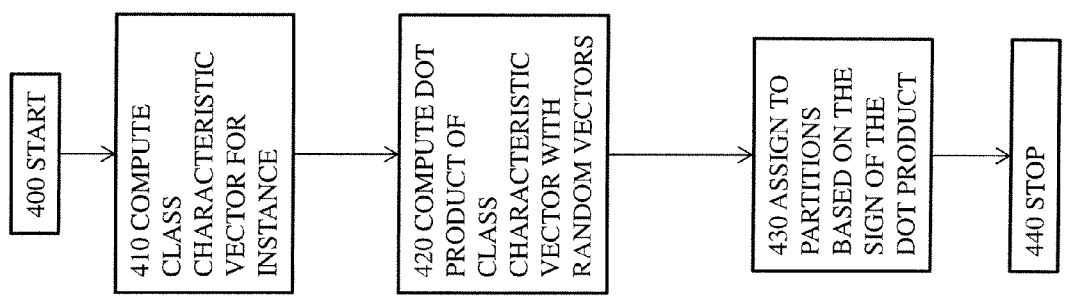
FIG. 4 is description of a class partitioning process according to an exemplary embodiment of the present disclosure.

FIG. 4, is a description of the class partitioning process of the present disclosure. In some exemplary embodiments the CPU partitions the training model into a plurality of class partitions. In some exemplary embodiments FIG. 4 can be considered to be a detailed description of the procedure performed at block 302 of FIG. 3. FIG. 4 is an exemplary procedure that may be used in order to determine which of the class partitions the particular message instance belongs, and to update the local statistic models for those class partitions.

At block 410, the class characteristic vector is computed for each message instance. This is performed as described above. At block 420, the dot product of the class characteristic vectors is computed with the random vectors, which were generated during initialization (e.g. block 210 of FIG. 2). At block 430, depending upon the sign of the aforementioned dot product computed at block 420, the message instance is assigned the appropriate class partition.

In some exemplary embodiments, the CPU 10 performs a LSH-based partitioning. The LSH-based partitioning can be performed in r different ways, with the use of r random projection vectors denoted by $\eta_1 \ldots \eta_r$. The value of r is typically much less than m. However, this is not necessarily the case in all embodiments.

Consider a training instance $T_j$ having sender $q_j$ and recipient set $R_j$. For example, for the i-th random projection vector, the training record $T_j$ is assigned to one of two partitions, depending on the sign of the dot product of $\eta_i$ and $\gamma(q_j, R_j)$ in $\{-1, 1\}$. Thereby, creating two class partitions with different social contexts, within which the training can be performed more effectively. The two class partitions for the i-th random projection are denoted by $P_i^{(+1)}$ and $P_i^{(-1)}$.

Thus, the training model may include 2·r class partitions. For each of the m different binary labels, a separate set of m local statistic models may be provided for each of the class partitions. Therefore, a total of 2·r·m local statistic models are constructed and maintained in the training model for the training instances. For each incoming training instance, the class partition to which it might belong is determined, based on the LSH function. If the class partition is determined, then the training model is updated with the use of the incoming training instance.

Figure 5:
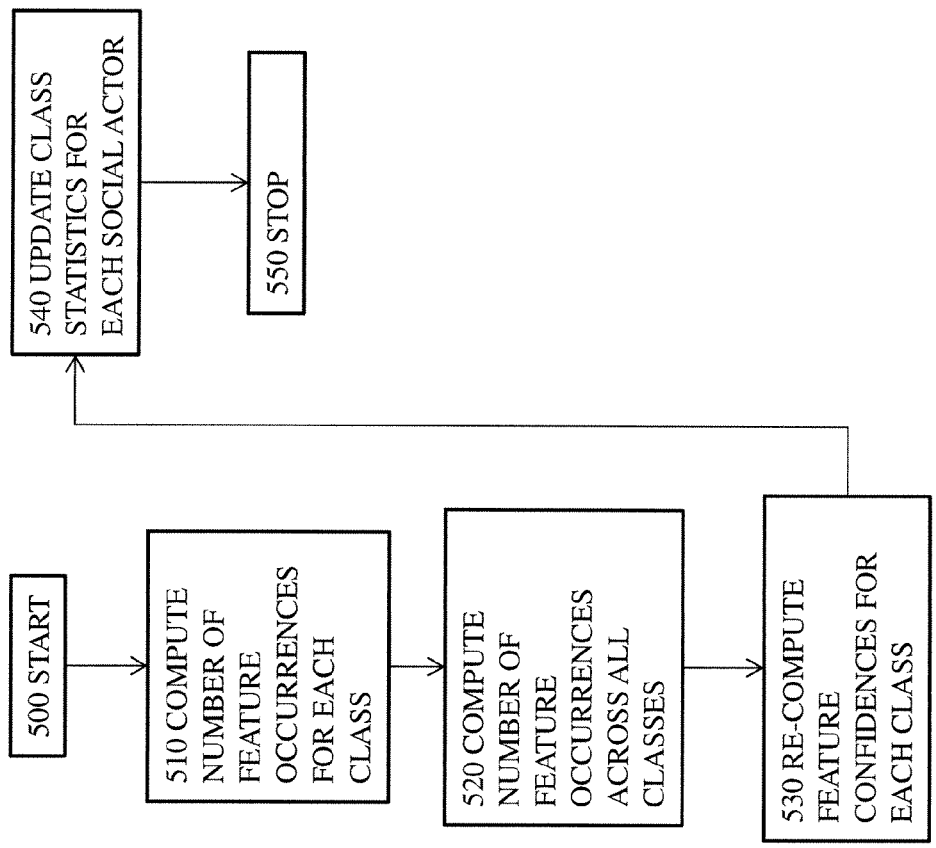
FIG. 5 is a description of a model-update process according to an exemplary embodiment of the present disclosure.

FIG. 5 is a description of the process of updating the local statistic models for the training model. Some exemplary embodiments, FIG. 5 can be considered to be a detailed description of block 310 of FIG. 3. At block 510, the number of message instances, in which a particular feature (or word) occurs, is computed for each class partition. At block 520, the number of messages instances, in which the particular feature (or word) occurs, is computed across all class partitions. One having ordinary skill in the art would appreciate that the order of block 510 and 520 can be reversed.

At block 530, feature confidences for each class are re-computed. The re-computed feature confidence may be defined as the ratio of the times the word occurs in a message instance corresponding to the class partition divided by its global occurrence across all class partitions.

At block 540, the local statistic models for each social actor (e.g. each node) are updated based on the number of instances of each class partition for that actor. Updating the number of instances for each class partition for the respective nodes can be useful for computing the characteristic vectors for the different actors and their corresponding messages.

Figure 6:
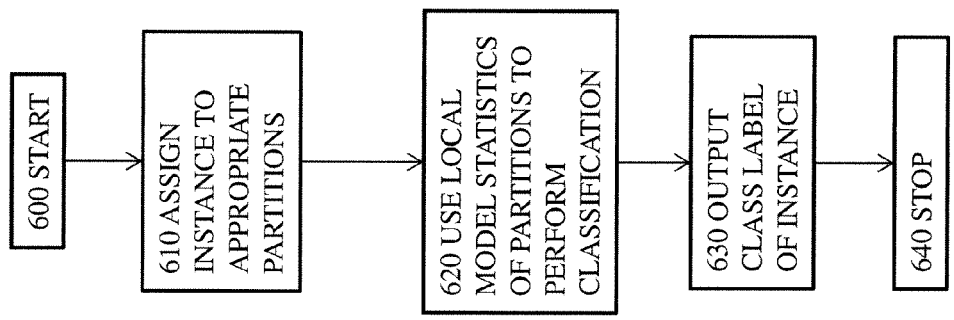
FIG. 6 is a description of a process of local statistic model classification with the use of an exemplary embodiment according to the present disclosure.

FIG. 6 is a detailed description of the process of classification with the use of the underlying local statistic models. In some exemplary embodiments, FIG. 4 is a detailed description of the features of block 610. Further, in some exemplary embodiments, FIG. 6 provides a detailed description of the features of block 250 of FIG. 2.

At block 610, the test instance, statistics of the sending node, and statistics of the receiving node are used in order to assign the test instance to the appropriate class partition(s). As described above with respect to FIG. 4, this assigns the test instance to a class partition. At block 620, if the test instance has been assigned to a class partition, then the local statistic models in that partition are used to classify the test instance.

It should be noted that, in some exemplary embodiments, the local statistic models of each class partition are continuously updated with the use of the procedure discussed with respect to FIG. 5. That is, the procedure of FIG. 5 may be leveraged in order to perform classifications of test instances based on how the words in that local statistic model are related to the local statistic models of different class partitions.

Specifically, the average class confidence across the different words in that message for each of these classes is computed. At block 620, the class with the highest class confidence may be determined. At block 630, this class is reported.

The test instance may be assigned to the class that is reported at block 630. Accordingly, the test instance (e.g., a message instance that is not labeled) can be classified according to exemplary embodiments of the present invention without overfitting a particular topic.

In another exemplary embodiment, at block 630, each class confidence that is determined to be above a predetermined threshold is reported. Accordingly, the test instance may be classified for multiple classes.

Based on the above disclosure, one having ordinary skill in the art would understand that there are additional ways that the test instance can be classified, such as, for example, classifying the top x highest confidences (where x is any integer that is greater than or equal to 1).

That is, for each incoming test instances the LSH procedure discussed above is applied in order to map the respective test instances to the different partitions of the training model. Each classifier of the training model is applied to the test instance separately based on the different LSH possibilities and at least one of the majority label, each label having a confidence value above a predetermined threshold, and the labels having the top x confidence values.

Referring back to FIG. 1A, the CPU 10 may generate the class characteristic vector described above with respect to block 302. In some exemplary embodiments, the class characteristic vector may be generated based on a number of messages for each class generated and/or posted by a user. In some exemplary embodiments, the class characteristic vector is generated for each user of the social network. In some of these exemplary embodiments, the CPU 10 generates the class characteristic before for each user based on the number of messages of each class posted by the respective user.

The class characteristic vector of a message may be generated based on the class characteristic vector of one or more senders of the message and the class characteristic vector of one or more recipients (or intended recipients) of the message.

In one embodiment, the CPU 10 classifies the one or more message instances that are not labeled based on the stored statistics. In some embodiments, the CPU 10 assigns an incoming test instance to one or more partitions, and then classifies the test instance based on statistics of the one or more partitions. The CPU 10 may also classify the one or more message instances that are not labeled based on the stored statistics and a frequency of the occurrence of a word in a respective partition.

At least one of the system 5 and the CPU 10 may output the test instance class labels so that the test instances may be classified based on one or more of the class labels, as described above with respect to blocks 620 and 630 of FIG. 6 and block 250 of FIG. 2.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining are and hardware aspects that may all generally be referred to herein as a "circuit," "module" or "system." Furthermore, aspects of the present invention may take the form of a computer program product embodied in one or more computer readable medium(s) having computer readable program code embodied thereon.

Figure 8:
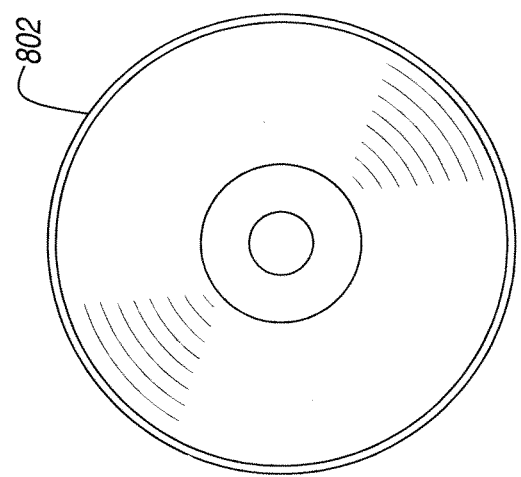
FIG. 8 is a description of exemplary storage media which may be used in conjunction with the typical hardware configuration of FIG. 7 and also with the exemplary architecture of FIG. 1A.
Figure 8:
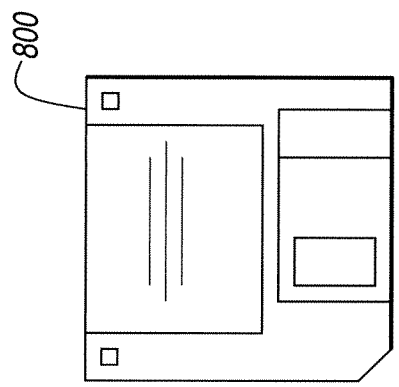

Any combination of one or more computer readable medium(s) may be utilized. The computer readable medium may be a computer readable signal medium or a computer readable storage medium. FIG. 8 shows some exemplary computer readable storage mediums. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or system. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
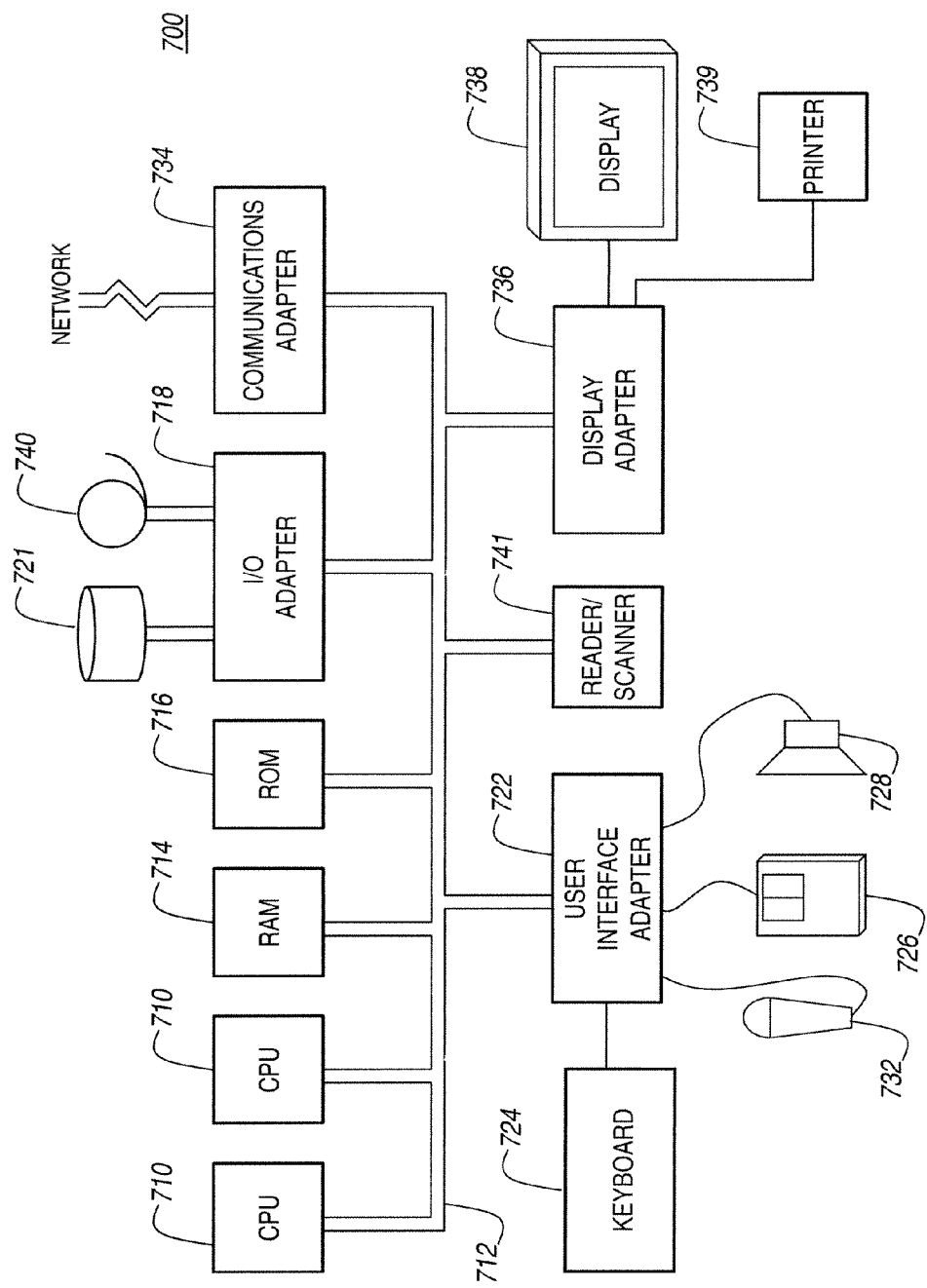
FIG. 7 is a typical hardware configuration which may be used for implementing the inventive aspects of the present disclosure.

FIG. 7 shows a typical hardware configuration 700, which may be used for implementing the aforementioned inventive aspects of the present disclosure. The configuration has preferably at least one processor or central processing unit (CPU) 710. The CPUs 710 are interconnected via a system bus 712 to a random access memory (RAM) 714, read-only memory (ROM) 716, input/output (I/O) adapter 718 (for connecting peripheral devices such as disk units 721 and tape drives 740 to the bus 712), user interface adapter 722 (for connecting a keyboard 724, mouse 726, speaker 728, microphone 732, and/or other user interface device to the bus 712), a communication adapter 734 for connecting an information handling system to a data processing network, the Internet, an Intranet, a personal area network (PAN), etc., and a display adapter 736 for connecting the bus 712 to a display device 738 and/or printer 739. Further, an automated reader/scanner 741 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of storage media.

Thus, this aspect of the present invention is directed to a programmed product, including storage media tangibly embodying a program of machine-readable instructions executable by a digital data processor to perform the above method.

Such a method may be implemented, for example, by operating the CPU 710 to execute a sequence of machine-readable instructions. These instructions may reside in various types of storage media.

Thus, this aspect of the present invention is directed to a programmed product, including storage media tangibly embodying a program of machine-readable instructions executable by a digital data processor incorporating the CPU 710 and hardware above, to perform the method of the invention.

This storage media may include, for example, a RAM contained within the CPU 710, as represented by the fast-access storage for example. Alternatively, the instructions may be contained in another storage media, such as a magnetic data storage diskette 800 or compact disc 802 (FIG. 8), directly or indirectly accessible by the CPU 710.

Whether contained in the computer system/CPU 710, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable storage media. In an illustrative embodiment of the invention, the machine-readable instructions may comprise software object code, compiled from a language such as C, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been described in terms of several exemplary embodiments, those skilled in the art will recognize that the invention can be practiced with modification within the spirit and scope of the described embodiments and the appended claims.

Further, it is noted that, Applicant's intent is to encompass equivalents of all claim elements, even if amended later during prosecution.

What is claimed is:

1. A method of labeling an unlabeled message of a social stream, the method comprising:
   training a training model of a social stream based on labeled messages, as executed by a processor on a computer;
   partitioning the training model into a plurality of class partitions, each partition based on a social context of the social stream and each partition having a model comprising statistical information for at least one class label;
   receiving an unlabeled message of the social stream;
   computing a confidence for each of the class partitions based on information of the unlabeled message and the statistical information of respective class partitions; and labeling the received unlabeled message of the social stream according to respective confidences of the class partitions.

2. The method according to claim 1, wherein the unlabeled message is labeled with a label of a class partition which has at least a certain confidence.

3. A method of social stream classification, the method comprising:
receiving a social stream including a plurality of message instances, the plurality of message instances including at least one of:
a test instance that is not classified; and
a training instance that is classified;
determining, for each message instance, linkage information of a sending node and a receiving node;
training a training model based on each training instance;
storing a plurality of statistical information including:
statistical information of words in the plurality of messages;
statistical information of the linkage information; and
statistical information of class partitions of the training model;
updating the plurality of statistical information over a period of time; and
classifying, as executed by a processor on a computer, each test instance based on the plurality of statistical information.

4. The method according to claim 3, further comprising partitioning the plurality of statistics based on the linkage information.

5. The method according to claim 3, wherein the class partitions each comprise local statistics,
wherein the plurality of statistical information comprises an aggregate of the local statistics of the class partitions, and
wherein the local statistics are stored separately from one another and are used for classifying the test instance.

6. The method according to claim 3, further comprising:
generating a plurality of class characteristic vectors including:
a class characteristic vector for each sending node; and
a class characteristic vector for each receiving node; and
partitioning the plurality of message instances based on the plurality of class characteristic vectors.

7. The method according to claim 6, wherein each class characteristic vector of the plurality of class characteristic vectors is generated based on a number of message instances belonging to each partition having been generated by each node.

8. The method according to claim 6, further comprising generating a class characteristic vector for a each message instance of the plurality of message instances,
wherein the class characteristic vector for each message instance is generated based on the class characteristic vector of each of its sending nodes and the class characteristic vector of each of its receiving nodes.

9. The method according to claim 3, further comprising assigning each message instance of the plurality of message instances to one or more partitions of the training model, based on the linkage information of each respective message instance.

10. The method according to claim 3, wherein if the training instance is received, then the plurality of statistical information of a relevant partition of the training model is updated based on information in the training instance.

11. The method according to claim 3, wherein if the test instance is received, then the test instance is assigned to a partition of the training model and classified based on statistical information stored in the partition where the test instance has been assigned.

12. The method according to claim 11, wherein the classifying of the test instance is further based on a frequency of an occurrence of words in the partition.

13. A method of social stream classification using a training model including plurality of class partitions, the method comprising:
receiving a social stream including a plurality of instances, the plurality of instances including at least one of:
a training instance that is classified; and
a test instance that is not classified;
determining, for each instance, linkage information and content information;
tracking relevance information, the relevance information including:
a number of times that words of the content information are relevant to one or more class partitions of the training model; and
a number of times that nodes, which are determined from the linkage information, belong to the relevant one or more class partitions of the training model;
updating statistical information of the training model based on the tracking; and
classifying, as executed by a processor in a computer system, each test instances based on the statistical information of the training model.

14. The method according to claim 13, wherein if a training instance is received, then the training model is incrementally updated, based on the classifying of that training instance.

15. The method according to claim 13, wherein if a test instance is received, then a confidence calculation of the test instance is performed for each class partition of the training model and the test instance is classified based on the confidence calculations.

16. The method according to claim 13, further comprising:
generating, for each instance, a plurality of vectors including:
a class characteristic vector for each sending node;
a class characteristic vector for each receiving node; and
a random vector; and
assigning the instance to a respective class partition based on the plurality of vectors.

17. The method according to claim 16, further comprising:
calculating an average of the class characteristic vector for each sending node and the class characteristic vector for each receiving node; and
assigning the instance to the respective class partition based on a dot product of the average and the random vector.

18. The method according to claim 16, wherein each class characteristic vector is generated based on a number of instances having been sent by each node and belonging to each of the class partitions.

19. The method according to claim 16, further comprising generating a class characteristic vector for each instance,
wherein the class characteristic vector for each instance is generated based on the class characteristic vector of each of its sending nodes and the class characteristic vector of each of its receiving nodes.

20. The method according to claim 13, further comprising:
generating a plurality of vectors including a random vector, based on the plurality of instances; and
partitioning the training model into $2 \cdot r$ class partitions, where r is a number of random vectors of the plurality of vectors.

21. The method according to claim 20, further comprising tracking m different topics in the social stream, wherein the training model comprises 2·r·m local statistic models, which use the statistical information to classify the test instances.

22. The method according to claim 13, further comprising assigning each instance to one or more of the class partitions based on the linkage information having been determined for that instance.

23. The method according to claim 13, further comprising:
partitioning the training model into a plurality of class partitions;
computing an average confidence, for each class partition, across words in a test instance; and
classifying the test instance based on a class partition having a highest average confidence across the words in the test instance.

24. A computer program product for social stream classification, the computer program product comprising a computer readable storage medium having computer readable program code embodied therewith, the computer readable program code comprising:
computer readable program code configured to receive a social stream including a plurality of message instances, the plurality of message instances including one or more of:
a test instance that is not classified; and
a training instance that is classified;
computer readable program code configured to determine, for each message of the plurality of messages instances, linkage information of a sending node and a receiving node based on a respective message;
computer readable program code configured to train a training model based on the training instance;
computer readable program code configured to store a plurality of statistical information including:
statistical information of words in the plurality of messages;
statistical information of the linkage information; and
statistical information of a plurality of class labels of the training model;
computer readable program code configured to update the plurality of statistical information over a period of time; and
computer readable program code configured to classify the test instance based on the plurality of statistics.

25. The computer program product according to claim 24, wherein the computer readable program code further comprises:
computer readable program code configured to partition the training model into a plurality of class partitions; and
computer readable program code configured to compute an average confidence across words in a test instance, for each class partition, and
wherein the test instance is classified according to statistics of a class partition that has a highest average confidence of the class partitions.

* * * * *